Feb. 18, 1969
H. H. HOENICK
3,428,152
CLOSED LOOP DISC BRAKE
Filed Nov. 18, 1966
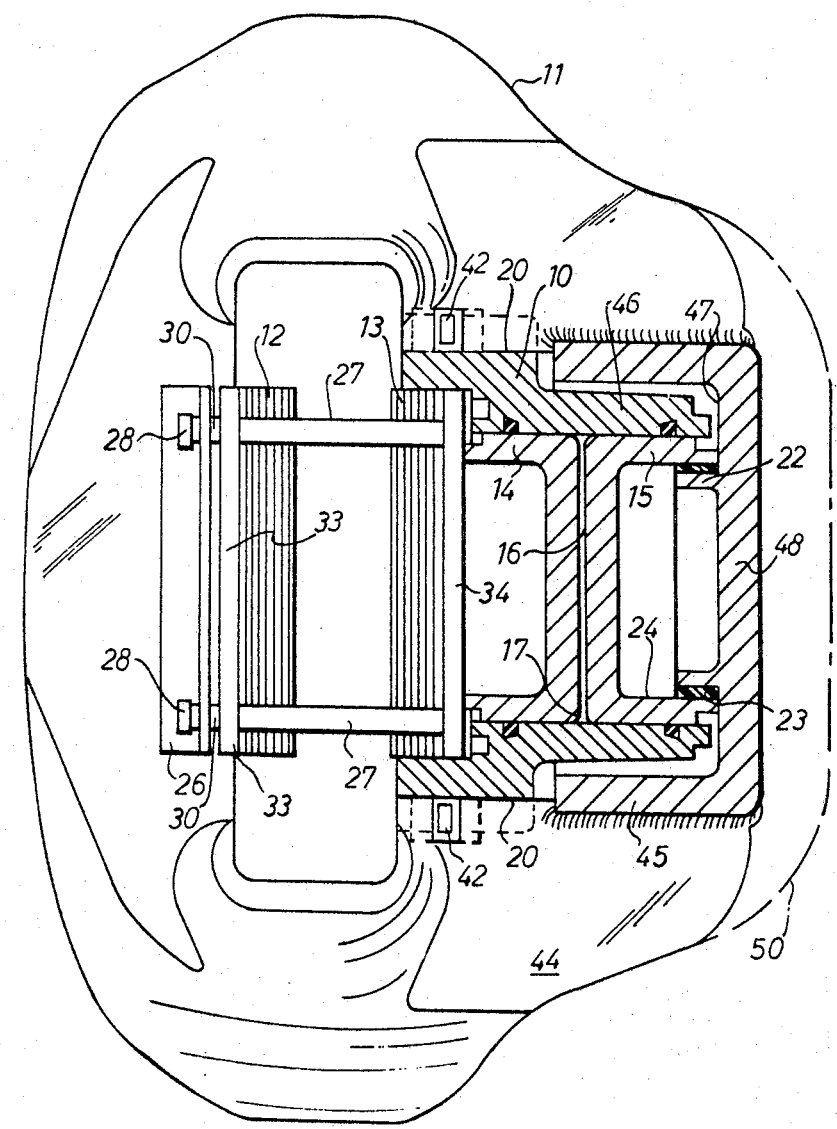
INVENTOR:
BY

United States Patent Office 3,428,152
Patented Feb. 18, 1969

3,428,152
CLOSED LOOP DISC BRAKE
Hermann Hans Hoenick, Immendorf, Germany, assignor to Girling Limited, Birmingham, England
Filed Nov. 18, 1966, Ser. No. 595,475
Claims priority, application Great Britain, Nov. 20, 1965, 49,392/65
U.S. Cl. 188—73　　　　　2 Claims
Int. Cl. F16d 55/00

ABSTRACT OF THE DISCLOSURE

The invention provides a spot type disc brake in which a yoke is slidably received in longitudinal grooves at opposite sides of a body member containing a hydraulic actuator. The yoke has a cup-like portion formed integrally therewith. The actuator is at least partially received in the cup-like portion and includes a movable member, e.g. a piston, which bears against the base of the cup-like portion for actuating an indirectly operated pad supported on the yoke. Another part of the actuator, such as another piston, acts against a directly operated pad.

---

The present invention relates to a spot type disc brake comprising a body member adapted to support a directly operated brake pad, a yoke slidably received in longitudinal grooves at opposite sides of said body member and adapted to support an indirectly operated brake pad opposed to said directly operated brake pad and a hydraulic actuator operative between said directly operated pad and said yoke.

According to the present invention, the yoke has a cup-like portion in which said hydraulic actuator is at least partially received and a movable part of the actuator engages the base of this cup-like portion for the operation of the indirectly operated pad. The cup-like portion of the yoke preferably has a circular profile.

Preferably the base of the cup-like portion of the yoke has an inwardly extending spigot which is received in a bore in said movable member of the actuator for locating the yoke relatively to said movable member.

The invention is further described, by way of example, with reference to the accompanying drawing which is a sectional plan view of a spot type disc brake constructed in accordance with the invention.

Referring to the drawing, a spot type disc brake comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons 14 and 15 slidable within a cylinder 16 constituted by a bore 17 in the body member 10.

The body member 10 has a pair of mounting lugs (not shown) adapted to be bolted to a torque plate or other fixed part of the wheel mounting (also not shown) adjacent a disc (also not shown) so that the disc periphery extends between the pads 12, 13. The body member 10 has a pair of longitudinal grooves 20 formed at opposite sides thereof in which grooves the inside edges of the yoke 11 are guided with clearance. A pair of rubber insert members 42 operative between the yoke 11 and the body member 10 have feet which rest against the radially inner faces of the grooves 20 and urge the yoke against the radially outer faces of the grooves 20. This prevents the yoke rattling on the body member.

The yoke mainly comprises a stamping 44 but has a cylindrical cup-like portion 45 secured to the stamping 44 e.g. by welding. The body member 10 has a tubular portion 46 which is received within the cup-like portion 45 and through which the actuator bore 17 extends. The piston 15 abuts the interior surface 47 of the base 48 of the cup-like portion 45 for transmitting the brake thrust via the yoke 11 to the indirectly operated pad 12. The yoke 11 is located in the piston 15 by an inwardly extending spigot 22 formed integrally with the cup-like portion 45 of the yoke and supported by a sleeve 23 in a blind bore 24 in the piston 15. The sleeve 23 is conveniently of a plastics material, such as nylon.

A bracket 26 is secured to the yoke 11 adjacent the pad 12 and supports a pair of pad-retaining pins 27 whose other ends are slidably received in suitable bores in the body member 10. The pins 27 have heads 28 to prevent the pins passing right through the bracket 26 and clips 30 hold the pins 27 captive on the brackets 26. Lugs formed on backing plates 33 and 34 respectively on the pads 12 and 13 have apertures through which pass the pins 27 whereby the pads 12 and 13 are suspended and located in their appropriate positions. An inlet (not shown) to the hydraulic cylinder 16 is provided for the brake line from the master cylinder.

The provision of the cup-like portion 45 of the yoke 11 enables the overall axial dimension of the brake to be reduced whilst maintaining the necessary strength of the yoke. If the yoke were made entirely of a stamping it would have a greater axial length as indicated by the chain-dotted profile 50 in order to avoid weakness in the vicinity of the piston 15.

I claim:
1. A spot type disc brake comprising a fixed body member, a cylindrical extension on said body member, said body member and said extension thereon having a through bore, a pair of opposed pistons slidable in said bore, a directly operated brake pad supported on said body member, one of said pistons acting on said directly operated pad, said body member having longitudinal grooves at opposite sides thereof, a plate-like yoke having side parts slidably received in said longitudinal grooves, a cup-like portion integrally joining said side parts of said yoke, said cylindrical extension on said body member extending into said cup-like portion of said yoke, and an indirectly operated brake pad supported by said yoke and opposed to said directly operated brake pad, said cup-like portion of said yoke having a base abutted by the other of said pistons and having means thereon locating said yoke in said other piston.

2. A disc brake according to claim 1 in which said other piston has a cylindrical blind bore and said locating means comprises an inwardly extending circular spigot received in said cylindrical blind bore.

References Cited

UNITED STATES PATENTS

| 3,185,263 | 5/1965 | Schanz et al. | 188—73 X |
| 3,245,500 | 4/1966 | Hambling et al. | |

FOREIGN PATENTS

| 905,797 | 9/1962 | Great Britain. |
| 968,898 | 9/1964 | Great Britain. |

FERGUS S. MIDDLETON, *Primary Examiner.*

G. E. A. HALVOSA, *Assistant Examiner.*